(12) United States Patent
Kawazura et al.

(10) Patent No.: US 8,557,926 B2
(45) Date of Patent: Oct. 15, 2013

(54) METHOD FOR PRODUCING MODIFIED POLYMER

(75) Inventors: Tetsuji Kawazura, Kanagawa (JP); Michiko Kawabata, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 13/696,085

(22) PCT Filed: Apr. 13, 2011

(86) PCT No.: PCT/JP2011/059171
§ 371 (c)(1),
(2), (4) Date: Nov. 5, 2012

(87) PCT Pub. No.: WO2011/138890
PCT Pub. Date: Nov. 10, 2011

(65) Prior Publication Data
US 2013/0053517 A1    Feb. 28, 2013

(30) Foreign Application Priority Data
May 7, 2010    (JP) .................................. 2010-106883

(51) Int. Cl.
*C08F 8/32*    (2006.01)

(52) U.S. Cl.
USPC ..................... 525/259; 525/333.6; 525/331.1; 525/347; 525/374; 525/377

(58) Field of Classification Search
USPC ............ 525/259, 333.6, 331.1, 347, 374, 377
See application file for complete search history.

(56) References Cited

U.S. PATENT DOCUMENTS

| | | | |
|---|---|---|---|
| 6,552,130 B1 * | 4/2003 | Makino et al. | ................. 525/222 |
| 2003/0065184 A1 | 4/2003 | Nesvadba et al. | |
| 2011/0224351 A1 * | 9/2011 | Mori et al. | ................... 524/458 |

FOREIGN PATENT DOCUMENTS

| | | |
|---|---|---|
| DE | 698 10 682 T2 | 3/1998 |
| DE | 101 13 209 A1 | 3/2001 |
| EP | 0 866 078 A2 | 9/1998 |
| JP | 01-204912 A | 8/1989 |
| JP | 10-259215 A | 9/1998 |
| JP | 2006-152229 | 6/2006 |
| JP | 2006-193577 A | 7/2006 |
| JP | 2006-199745 A | 8/2006 |
| JP | 2007-186719 | 7/2007 |
| JP | 2007-231244 A | 9/2007 |
| JP | 4046734 | 11/2007 |
| JP | 4101242 | 3/2008 |
| JP | 4243320 | 1/2009 |
| JP | 4286300 | 4/2009 |
| WO | WO 2008/004686 A1 | 1/2008 |
| WO | WO2009/065774 A1 | 5/2009 |
| WO | WO 2010038835 A1 * | 4/2010 |

OTHER PUBLICATIONS

International Search Report based on corresponding PCT application No. PCT/JP2011/059171 dated May 17, 2011 (4 pgs).
Partial English translation of German Office Action from corresponding German application No. 11 2011 101 593.3 dated Apr. 15, 2013 (2 pgs).
International Preliminary Report on Patentability and Written Opinion from corresponding PCT application No. PCT/JP2011/059171 dated Dec. 20, 2012 (5 pgs).

* cited by examiner

*Primary Examiner* — Mark Kaucher
(74) *Attorney, Agent, or Firm* — Brinks Hofer Gilson & Lione

(57) ABSTRACT

A modified polymer is produced by reacting (A) a polymer with (B) a compound having a nitroxide free radical in the molecule stable at room temperature and in the presence of oxygen, (C) an organic peroxide, and (D) a radically polymerizable monomer having a functional group in the presence of (E) an amine compound comprising a monoamine compound represented by the general formula: $NR^1R^2R^3$ ($R^1$: $C_1$-$C_{20}$ alkyl group or aryl group; $R^2$ and $R^3$: H, $C_1$-$C_{20}$ alkyl group, or aryl group) or a polyamine compound represented by the general formula: $(R^4)_2N(R^5N)_nR^6N(R^4)_2$ ($R^4$: H or $C_1$-$C_6$ alkyl group; $R^5$ and $R^6$: $C_1$-$C_6$ alkylene group; n: 0 to 20). This method can not only reduce the reaction temperature but also improve the modification rate.

16 Claims, No Drawings

METHOD FOR PRODUCING MODIFIED POLYMER

RELATED APPLICATION

This application is a 35 U.S.C. §371 national phase filing of International Patent Application No. PCT/JP2011/059171, filed Apr. 13, 2011, through which and to which priority is claimed under 35 U.S.C. §119 to Japanese Patent Application No. 2010-106883, May 5, 2010.

TECHNICAL FIELD

The present invention relates to a method for producing a modified polymer. More particularly, the present invention relates to a method for producing a modified polymer by radical reaction of a polymer with a nitroxide free radical-containing compound and a functional group-containing polymerizable monomer.

BACKGROUND ART

It is conventionally known that a modified polymer is produced by reacting a polymer with a compound having a nitroxide free radical in the molecule stable at room temperature and in the presence of oxygen, an organic peroxide, and a radically polymerizable monomer having a functional group.

For example, Patent Documents 1 and 2, which disclose the inventions filed by the present applicant, disclose a method for producing a modified polymer, the method comprising mixing and reacting a polymer having an isomonoolefin unit (e.g., polyisobutylene, butyl rubber, isobutylene/para-methylstyrene copolymer, halogenated butyl rubber, or a brominated isobutylene/para-methylstyrene copolymer), 2,2,6,6-tetramethyl-1-piperidinyloxy or its derivative (i.e., a nitroxide free radical-containing compound), and an organic peroxide in a non-solvent system in a kneader, and reacting the resulting mixture with a functional group-containing polymerizable monomer comprising an acrylic monomer or an aromatic vinyl monomer to graft the polymer having an isomonoolefin unit with the functional group-containing polymerizable monomer, thereby producing a modified polymer.

According to the descriptions of the Examples of Patent Documents 1 and 2, the graft reactions of the polymer having an isomonoolefin unit with the nitroxide free radical-containing compound and the functional group-containing polymerizable monomer were carried out by kneading for 15 minutes at temperatures of 175° C. and 185° C., respectively.

PRIOR ART DOCUMENT

Patent Document

Patent Document 1: JP-B-4046734
Patent Document 2: JP-B-4286300
Patent Document 3: JP-B-4101242
Patent Document 4: JP-B-4243320

OUTLINE OF THE INVENTION

Problem to be Solved by the Invention

An object of the present invention is to provide a method for producing a modified polymer, the method comprising reacting a polymer with a compound having a nitroxide free radical in the molecule stable at room temperature and in the presence of oxygen, an organic peroxide, and a radically polymerizable monomer having a functional group, the method being capable of not only reducing the reaction temperature but also improving the modification rate.

Means for Solving the Problem

The above object of the present invention can be achieved by a method for producing a modified polymer, the method comprising reacting (A) a polymer with (B) a compound having a nitroxide free radical in the molecule stable at room temperature and in the presence of oxygen, (C) an organic peroxide, and (D) a radically polymerizable monomer having a functional group in the presence of (E) an amine compound comprising a monoamine compound represented by the general formula:

$$NR^1R^2R^3 \quad [I]$$ 

wherein $R^1$ is an alkyl group having 1 to 20 carbon atoms or an aryl group, and $R^2$ and $R^3$ are each independently a hydrogen atom, an alkyl group having 1 to 20 carbon atoms, or an aryl group, or a polyamine compound represented by the general formula:

$$(R^4)_2N(R^5N)_nR^6N(R^4)_2 \quad [II]$$ 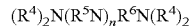

wherein $R^4$ is a hydrogen atom or an alkyl group having 1 to 6 carbon atoms, $R^5$ and $R^6$ are each independently an alkylene group having 1 to 6 carbon atoms, and n is an integer of 0 to 20; preferably by a method for producing a modified polymer, the method comprising reacting the polymer as component (A) with the nitroxide free radical-containing compound as component (B), the organic peroxide as component (C), and the amine compound as component (E), and then reacting the resulting mixture with the functional group-containing radically polymerizable monomer as component (D).

Effect of the Invention

The method of the present invention can reduce the reaction temperature, at which the graft reaction of a polymer with a nitroxide free radical-containing compound is carried out in the presence of an amine compound represented by the general formula [I] or [II], from conventional temperatures of 175° C. and 185° C. to 120 to 170° C. The method of the present invention can also improve the modification rate (the amount of grafting) of the resulting modified polymer.

EMBODIMENTS FOR CARRYING OUT THE INVENTION

Usable examples of the polymer as component (A) to be modified include diene rubbers, olefin polymers, and the like. Preferably, a polymer containing an isobutylene group in the constitutional unit is used.

Usable diene rubbers are natural rubber, polyisoprene rubber, polybutadiene rubber, styrene-butadiene rubber, acrylonitrile-butadiene rubber, hydrogenated acrylonitrile-butadiene rubber, chloroprene rubber, and the like. As the styrene-butadiene rubber, both emulsion-polymerized SBR (E-SBR) and solution-polymerized SBR (S-SBR) can be used.

Moreover, usable olefin polymers are, for example, ethylene-propylene copolymers, ethylene-butene copolymers, and other ethylene-α-olefin copolymers.

Examples of the polymer having an isobutylene group as a constitutional unit include, as described above, polyisobutylene, butyl rubber, isobutylene/para-methylstyrene copolymers, halogenated butyl rubber, brominated isobutylene/para-methylstyrene copolymers, and the like.

The compound as component (B) having a nitroxide free radical (—N—O.) in the molecule stable at room temperature and in the presence of oxygen is described in detail in Patent Documents 1 to 4. Preferably, 2,2,6,6-tetramethylpiperidine-1-oxyl [TEMPO]:

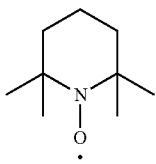

or a derivative thereof is used.

Examples of the derivative of TEMPO include 4-substituted derivatives, such as oxo, methyl, ethyl, methoxy, ethoxy, chloro, amino, hydroxyl, carboxyl, isocyanate, glycidyl ether, thioglycidyl ether, phenyl, phenoxy, methylcarbonyl, ethylcarbonyl, benzoyl, benzoyloxy, acetoxy, ethoxycarbonyl, N-methylcarbamoyloxy, N-ethylcarbamoyloxy, and N-phenylcarbamoyloxy, and the like. Other examples are methyl sulfate, ethyl sulfate, phenyl sulfate, and the like.

The organic peroxide as component (C) is used in the modification reaction using TEMPO or a derivative thereof and a functional group-containing radically polymerizable monomer as modifying agents. Examples thereof include benzoyl peroxide, tert-butylperoxy benzoate, dicumyl peroxide, tert-butyl cumyl peroxide, di-tert-butyl peroxide, 2,5-dimethyl-2,5-di-tert-butylperoxyhexane, 2,5-dimethyl-2,5-di-tert-butylhexine-3,2,4-dichlorobenzoyl peroxide, di-tert-butyl-peroxy di-isopropylbenzene, 1,1-bis(tert-butylperoxy)-3,3,5-trimethylcyclohexane, n-butyl-4,4-bis(tert-butylperoxy)valerate, 2,2-bis(tert-butylperoxy)butane, and the like.

Such an organic peroxide can be added to the reaction system comprising the compound having a nitroxide radical in the molecule and the functional group-containing radically polymerizable monomer so that the polymer generates carbon radicals.

The amount of each of the above components is as follows: based on 100 parts by weight of polymer as component (A), the nitroxide radical-containing compound as compound (B) is used in an amount of 1 part by weight or more, preferably 1.5 to 20 parts by weight, and the organic peroxide as component (C) is used in an amount of 0.01 to 30 parts by weight, preferably 0.05 to 20 parts by weight. Further, the molar ratio of the nitroxide radical-containing compound to the organic peroxide is 0.5 or more, preferably 1 or more, more preferably 1.0 to 50.0.

When the amount of the nitroxide radical-containing compound used is lower than the above range, the desired polymer modification rate cannot be achieved. In contrast, when the amount is greater than the above range, a large amount of unreacted nitroxide radical-containing compound remains in the system, possibly reducing the physical properties of the resulting modified polymer. When the amount of organic peroxide used is lower than the above range, the desired polymer modification rate cannot be achieved; whereas when the amount is greater than the above range, the degradation or deterioration of the polymer is promoted, causing the reduction of the physical properties of the modified polymer. Moreover, when the molar ratio of the nitroxide radical-containing compound to the organic peroxide is lower than the above range, the degradation or deterioration of the polymer chain to be modified cannot be prevented, possibly reducing the molecular weight.

The radically polymerizable monomer having a functional group as component (D) is preferably one having an electrophilic group, such as a carbonyl group, halogen, or a cyano group; particularly preferably one having a (meth)acryloxy group. Here, the (meth)acryloxy group indicates an acryloxy group or a methacryloxy group. Moreover, the (meth)acrylate indicates acrylate or methacrylate.

Examples of the functional group-containing radically polymerizable monomer include γ-(meth)acryloxypropyl group-containing silanes, such as γ-methacryloxypropyltrimethoxysilane, γ-methacryloxypropyltriethoxysilane, γ-methacryloxypropyltriphenoxysilane, γ-methacryloxypropylmethyldiphenoxysilane, γ-methacryloxypropyldimethylphenoxysilane, γ-methacryloxypropylmethyldiethoxysilane, γ-methacryloxypropyldimethylethoxysilane, γ-acryloxypropyltrimethoxysilane, γ-acryloxypropyltriethoxysilane, γ-acryloxypropyltriphenoxysilane, γ-acryloxypropylmethyldiphenoxysilane, γ-acryloxypropyldimethylphenoxysilane, γ-acryloxypropylmethyldiethoxysilane, and γ-acryloxypropyldimethylethoxysilane; and polymerizable monomers having a (meth)acryloxy group, other than γ-(meth)acryloxypropyl group-containing silanes, such as ditrimethylolpropane tetraacrylate, 2-(2-ethoxyethoxy)ethyl acrylate, stearyl(meth)acrylate, tetrahydrofurfuryl(meth)acrylate, lauryl(meth)acrylate, 2-phenoxyethyl(meth)acrylate, isodecyl acrylate, 3,3,5-trimethylcyclohexane acrylate, isooctyl acrylate, octyl/decyl acrylate, tridecyl(meth)acrylate, caprolactone acrylate, ethoxylated nonylphenol acrylate, isobornyl acrylate, cyclic trimethylolpropane formal acrylate, methoxypolyethylene glycol mono(meth)acrylate, methoxypolyethylene glycol di(meth)acrylate, alkoxylated tetrahydrofurfuryl acrylate, alkoxylated nonylphenol acrylate, alkoxylated lauryl acrylate, alkoxylated phenol acrylate, isodecyl methacrylate, tridecyl methacrylate, isobornyl methacrylate, propoxylated allyl methacrylate, ethoxylated hydroxyethyl methacrylate, polypropyleneglycol monomethacrylate, ethoxylated nonylphenol methacrylate, 1,3-butyleneglycol monoacrylate, 1,3-butyleneglycol di(meth)acrylate, 1,4-butyleneglycol diacrylate, diethyleneglycol di(meth)acrylate, 1,6-hexanediol di(meth)acrylate, neopentylglycol di(meth)acrylate, polyethyleneglycol diacrylate, tetraethyleneglycol di(meth)acrylate, triethyleneglycol di(meth)acrylate, tripropyleneglycol diacrylate, polyethyleneglycol di(meth)acrylate, ethoxylated bisphenol A di(meth)acrylate, cyclohexanedimethanol di(meth)acrylate, dipropyleneglycol diacrylate, dioxaneglycol diacrylate, alkoxylated hexanediol diacrylate, alkoxylated cyclohexanedimethanol diacrylate, tricyclodecanedimethanol diacrylate, propoxylated neopentylglycol diacrylate, alkoxylated neopentylglycol diacrylate, ethyleneglycol dimethacrylate, 1,4-butanediol dimethacrylate, 1,12-dodecanediol dimethacrylate, trimethylolpropane triacrylate, ethoxylated trimethylolpropane triacrylate, tris(2-hydroxyethyl)isocyanurate triacrylate, pentaerythritol triacrylate, propoxylated trimethylolpropane triacrylate, propoxylated glyceryl triacrylate, pentaerythritol tetraacrylate, ethoxylated tetraacrylate, and dipentaerythritol pentaacrylate. Examples of polymerizable monomers having a functional group other than a (meth)acryloxy group include triallyl isocyanurate, triallyl cyanurate, and the like.

Other usable examples of the functional group-containing radically polymerizable monomer as component (D) include styrene or various derivatives thereof, divinylbenzene, N,N'- m-phenylenemaleimide, N,N'-m-phenyleneacrylamide, bis-maleimide diphenylmethane, and other aromatic vinyl monomers. Specific examples of component (D) are described in Patent Documents 1 and 2.

Such a component (D) is used in the two-step reaction in an amount of 0.1 to 20 parts by mass, preferably 1 to 10 parts by mass, based on 100 parts by mass of polymer bonded the nitroxide radical-containing compound. When the amount of component (D) used is less than this range, the desired modified polymer cannot be obtained. Conversely, when the amount is greater than this range, the resulting modified polymer contains an unreacted or homopolymerized functional group-containing radically polymerizable monomer; thus the desired modified polymer cannot also be obtained.

These components each used in the above ratio are mixed and reacted using a heating mixer at a temperature of 140 to 170° C. to thereby modify the polymer. As the heating mixer, a kneader, a Banbury mixer, a twin-screw kneader, a Henschel mixer, or the like, generally used as a heating mixer for rubber can be used.

The heat-mixture of the components using a heating mixer is preferably carried out by two-step radical polymerization. More specifically, the polymer, the nitroxide free radical-containing compound, the organic peroxide, and the amino compound are supplied to the heating mixer. After stirring at room temperature to about 100° C. for about 5 minutes, the temperature of the mixture is raised. When the temperature reaches 120 to 170° C., preferably 140 to 160° C., the reaction is carried out at that temperature for about 5 to 20 minutes. Thus, the first modification of the polymer with the nitroxide free radical-containing compound is carried out.

Examples of the amine compound represented by the above general formula [I] as component (E) used in this reaction include methylamine, ethylamine, propylamine, isopropylamine, butylamine, isobutylamine, tert-butylamine, pentylamine, isopentylamine, hexylamine, heptylamine, octylamine, 2-ethylhexylamine, diisobutylamine, nonylamine, decylamine, undecylamine, dodecylamine, tetradecylamine, hexadecylamine, octadecylamine, eicosylamine, docosylamine, amylamine, N,N-dimethylaniline, trimethylamine, triethylamine, tributylamine, triphenylamine, N,N-dimethylcyclohexylamine, N,N,N',N'-tetramethylethylenediamine, tetramethylguanidine, triethylenediamine, N-methylmorpholine, and the like.

Furthermore, examples of the amine compound represented by the above general formula [II] as component (E) include ethylenediamine, diaminopropane, diaminobutane, diaminopentane, hexamethylenediamine, diaminoheptane, diaminooctane, diaminononane, diaminodecane, N-methylethylenediamine, N-ethylethylenediamine, N-propylethylenediamine, N,N-dimethylethylenediamine, N,N,N-trimethylethylenediamine, N-methyl-1,3-propanediamine, N,N,N-trimethyl-1,3-propanediamine, diethylenetriamine, triethylenetetramine, tetraethylenepentamine, N-(2-aminoethyl)-1,3-propanediamine, N-(3-aminopropyl)-1,3-propanediamine, N,N-bis(3-aminopropyl)-1,3-propanediamine, and the like.

Such a component (E) is used in a ratio of 20 to 100 mol %, preferably 50 to 80 mol %, relative to the organic peroxide. When the amount of component (E) used is lower than this range, the effects of reducing the reaction temperature and improving the modification rate cannot be achieved.

After the first modification of the polymer with the nitroxide free radical-containing compound as component (B) is carried out in the above manner, the second modification of the polymer with the functional group-containing radically polymerizable monomer as component (D) is carried out under the same reaction conditions as those conventionally used. More specifically, the reaction is performed by kneading at a temperature of 160 to 190° C., preferably 170 to 180° C., for about 5 to 20 minutes. Although it is preferable to subject the modifying agents, i.e., components (B) and (D), to modification reaction in two steps in this manner, components (B) and (D) can be subjected to modification reaction at the same time.

Despite the fact that the graft reaction in the presence of the amine compound represented by the general formula [I] or [II] as component (E) is carried out under low-temperature conditions of 120 to 170° C., preferably 140 to 160° C., the resulting modified polymer can improve the modification rate (the amount of grafting) of the nitroxide free radical-containing compound as component (B) to about 0.3 mol %, and the modification rate (the amount of grafting) of the functional group-containing radically polymerizable monomer as component (D) to about 0.1 mol %.

EXAMPLES

The following describes the present invention with reference to Examples.

Comparative Example 1

(1) Natural rubber (360 g), 6.37 g of 4-hydroxy-2,2,6,6-tetramethylpiperidine-1-oxyl [OH-TEMPO] (LA7RD, produced by Adeka Corp.) (molar ratio based on organic peroxide: 18.5), and 0.274 g of a mixture of bis(tert-butyldioxyisopropyl)benzene and calcium carbonate (weight ratio=40:60) [DTBPOPB] (Perkadox 14-40, produced by Kayaku Akzo Corporation) were supplied to a 600-ml closed-type mixer and stirred at 40° C. for 5 minutes. After the inside of the mixer was made a nitrogen atmosphere, the temperature of the mixture was raised to 185° C. The mixture was reacted by kneading at that modification temperature for 15 minutes, thereby obtaining a modified natural rubber A (corresponding to the total amount (366.6 g) of the starting materials used).

(2) To a 600-ml closed-type mixer, 346.3 g of modified natural rubber A and 9.45 g of γ-methacryloxypropyltrialkoxysilane [silane KBM] (KBM-503, produced by Shin-Etsu Chemical Co., Ltd.) were added. After the inside of the mixer was made a nitrogen atmosphere, the mixture was reacted by kneading at 180° C. for 25 minutes using a Henschel mixer, thereby obtaining a modified natural rubber B.

(3) The residual rates of OH-TEMPO in the modified natural rubbers A and B in steps (1) and (2) above were 0.55 wt. % and 0.41 wt. %, respectively. Moreover, the modification rate (the amount of grafting) of OH-TEMPO and the modification rate (the amount of grafting) of silane KBM in step (2) above were 0.34 mol % and 0.27 mol %, respectively.

The modification rate of OH-TEMPO and the modification rate of silane KBM were calculated in the following manner. The test sample was dissolved in toluene and then added dropwise to an excess amount of methanol while stirring to form a precipitate. After this operation was repeated twice, the resulting precipitated polymer was dried in a vacuum dryer at 60° C. for 48 hours. The dried polymer was dissolved in heavy chloroform and analyzed by $^1$H NMR. The modification rate of OH-TEMPO and the modification rate of silane KBM were calculated from the ratio of the numbers of hydroxyl protons.

Example 1

In Comparative Example 1 (1), 0.079 g of triphenylamine (50 mol % based on DTBPOPB) was further added, and the reaction temperature was changed to 140° C. Subsequently, the same steps as steps (2) and (3) of Comparative Example 1 were performed.

Example 2

In Comparative Example 1 (1), 0.039 g of N,N-dimethylaniline (50 mol % based on DTBPOPB) was further added, and the reaction temperature was changed to 140° C. Subsequently, the same steps as steps (2) and (3) of Comparative Example 1 were performed.

Example 3

In Comparative Example 1 (1), 0.061 g of tetraethylenepentamine (50 mol % based on DTBPOPB) was further added, and the reaction temperature was changed to 140° C. Subsequently, the same steps as steps (2) and (3) of Comparative Example 1 were performed.

Example 4

In Comparative Example 1 (1), the amount of DTBPOPB was changed to 0.411 g, 0.119 g of triphenylamine (75 mol % based on DTBPOPB) was further added, and the reaction temperature was changed to 140° C. Subsequently, the same steps as steps (2) and (3) of Comparative Example 1 were performed.

Example 5

In Comparative Example 1 (1), the amount of DTBPOPB was changed to 0.411 g, 0.119 g of triphenylamine (75 mol % based on DTBPOPB) was further added, and the reaction temperature was changed to 120° C. Subsequently, the same steps as steps (2) and (3) of Comparative Example 1 were performed.

Example 6

In Comparative Example 1 (1), the amount of DTBPOPB was changed to 0.411 g, 0.059 g of N,N-dimethylaniline (75 mol % based on DTBPOPB) was further added, and the reaction temperature was changed to 120° C. Subsequently, the same steps as steps (2) and (3) of Comparative Example 1 were performed.

Example 7

In Comparative Example 1 (1), the amount of DTBPOPB was changed to 0.411 g, 0.092 g of tetraethylenepentamine (50 mol % based on DTBPOPB) was further added, and the reaction temperature was changed to 120° C. Subsequently, the same steps as steps (2) and (3) of Comparative Example 1 were performed.

Table 1 below shows the results obtained in Comparative Example 1 and the Examples.

TABLE 1

|  | Comp. Ex. 1 | Example 1 | Example 2 | Example 3 | Example 4 | Example 5 | Example 6 | Example 7 |
|---|---|---|---|---|---|---|---|---|
| [Modified natural rubber A] | | | | | | | | |
| DTBPOPB (40%) (mg) | 274 | 274 | 274 | 274 | 411 | 411 | 411 | 411 |
| Triphenylamine (mg) | — | 79 | — | — | 119 | 119 | — | — |
| N,N-dimethylaniline (mg) | — | — | 39 | — | — | — | 59 | — |
| Tetraethylenepentamine (mg) | — | — | — | 61 | — | — | — | 92 |
| Modification temp. (° C.) | 185 | 140 | 140 | 140 | 140 | 120 | 120 | 120 |
| OH-TEMPO residual rate (wt. %) | 0.55 | 0.49 | 0.64 | 0.53 | 0.56 | 0.55 | 0.51 | 0.50 |
| OH-TEMPO modification rate (mol %) | 0.34 | 0.94 | 0.50 | 0.53 | 0.98 | 0.81 | 0.56 | 0.59 |
| [Modified natural rubber B] | | | | | | | | |
| OH-TEMPO residual rate (wt. %) | 0.41 | 0.38 | 0.49 | 0.38 | 0.48 | 0.39 | 0.49 | 0.48 |
| Silane KBM modification rate (mol %) | 0.27 | 0.76 | 0.52 | 0.47 | 0.89 | 0.77 | 0.51 | 0.55 |

Comparative Examples 2 to 4, and Examples 8 to 12

(1) Butyl rubber (360 g; Butyl 301, produced by Lanxess K.K.), 32.2 g of OH-TEMPO, 60.6 g of DTBPOPB (40%), and 35.1 g of triphenylamine (100 mol % based on DTBPOPB) or 17.3 g of N,N-dimethylaniline (100 mol % based on DTBPOPB) were supplied to an M600 type, closed-type mixer. After stirring at 40° C. for 5 minutes, the temperature of the mixture was raised to a specified temperature. The mixture was reacted by kneading at that modification temperature for 30 minutes, thereby obtaining a modified butyl rubber A (corresponding to the total amount of the starting materials used).

(2) To the following specified amount of the modified butyl rubber A, 0.34 g of γ-methacryloxypropyltrialkoxysilane [silane KBM] and 21.76 g of ditrimethylolpropane tetraacrylate

[DTMPTA] were added. The mixture was then kneaded at 180° C. for 30 minutes using a Henschel mixer, thereby obtaining a modified butyl rubber B.

Table 2 shows the type of amine, the modification temperature, and the OH-TEMPO modification rate used in step (1) above, and the amount of the modified butyl rubber, and the DTMPTA modification rate used in step (2) above.

TABLE 2

|  | Comp. Ex. | | | Example | | | | |
| --- | --- | --- | --- | --- | --- | --- | --- | --- |
|  | 2 | 3 | 4 | 8 | 9 | 10 | 11 | 12 |
| [Modified butyl rubber A] | | | | | | | | |
| Triphenylamine | — | — | — | ○ | ○ | ○ | — | — |
| Dimethylaniline | — | — | — | — | — | — | ○ | ○ |
| Modification temp. (° C.) | 140 | 160 | 180 | 140 | 160 | 170 | 140 | 160 |
| OH-TEMPO modification rate (mol %) | 0.028 | 0.041 | 0.301 | 0.310 | 0.331 | 0.309 | 0.301 | 0.321 |
| [Modified butyl rubber B] | | | | | | | | |
| Modified butyl rubber A (g) | 442.8 | 442.8 | 442.8 | 477.9 | 477.9 | 477.9 | 480.1 | 480.1 |
| Acrylate modification rate (mol %) | 0.097 | 0.090 | 0.145 | 0.141 | 0.153 | 0.140 | 0.144 | 0.151 |

The invention claimed is:

1. A method for producing a modified polymer, the method comprising reacting (A) a polymer with (B) a compound having a nitroxide free radical in the molecule stable at room temperature and in the presence of oxygen, (C) an organic peroxide, and (D) a radically polymerizable monomer having a functional group in the presence of (E) an amine compound comprising
a monoamine compound represented by the general formula:

NR¹R²R³  [I]

wherein R¹ is an alkyl group having 1 to 20 carbon atoms or an aryl group, and R² and R³ are each independently a hydrogen atom, an alkyl group having 1 to 20 carbon atoms, or an aryl group; or
a polyamine compound represented by the general formula:

(R⁴)₂N(R⁵N)ₙR⁶N(R⁴)₂  [II]

wherein R⁴ is a hydrogen atom or an alkyl group having 1 to 6 carbon atoms, R⁵ and R⁶ are each independently an alkylene group having 1 to 6 carbon atoms, and n is an integer of 0 to 20, said reacting being conducted at a reaction temperature of 120 to 170° C.

2. The method for producing a modified polymer according to claim 1, wherein after the nitroxide free radical-containing compound as component (B), the organic peroxide as component (C), and the amine compound as component (E) are added and reacted with the polymer as component (A), the functional group-containing radically polymerizable monomer as component (D) is added and reacted.

3. The method for producing a modified polymer according to claim 1, wherein the reaction in the presence of the amine compound as component (E) is carried out at 120 to 140° C.

4. The method for producing a modified polymer according to claim 1, wherein the reaction is carried out using a heating mixer.

5. The method for producing a modified polymer according to claim 1, wherein the polymer as component (A) is a diene rubber or an olefin polymer.

6. The method for producing a modified polymer according to claim 1, wherein the polymer as component (A) is a polymer containing an isobutylene group as a constitutional unit.

7. The method for producing a modified polymer according to claim 1, wherein the nitroxide free radical-containing compound as component (B) is 2,2,6,6-tetramethyl-1-piperidinyloxy or a derivative thereof.

8. The method for producing a modified polymer according to claim 1, wherein the functional group-containing radically polymerizable monomer as component (D) is a monomer having an electrophilic group.

9. The method for producing a modified polymer according to claim 8, wherein the monomer having an electrophilic group as component (D) is a γ-(meth)acryloxypropyl group-containing silane, or a polymerizable monomer having a (meth)acryloxy group other than γ-(meth)acryloxypropyl group-containing silanes or aromatic vinyl monomer.

10. The method for producing a modified polymer according to claim 1, wherein the nitroxide free radical-containing compound as component (B) is used in an amount of 1 part by weight or more, and the organic peroxide as component (C) is used in an amount of 0.01 to 30 parts by weight, based on 100 parts by weight of polymer as component (A); and the molar ratio of the nitroxide free radical-containing compound to the organic peroxide is 0.5 or more.

11. The method for producing a modified polymer according to claim 1, wherein the nitroxide free radical-containing compound as component (B) is used in an amount of 1.5 to 20 parts by weight, and the organic peroxide as component (C) is used in an amount of 0.05 to 20 parts by weight, based on 100 parts by weight of polymer as component (A); and the molar ratio of the nitroxide free radical-containing compound to the organic peroxide is 1.0 to 50.0.

12. The method for producing a modified polymer according to claim 2, wherein the functional group-containing radically polymerizable monomer as component (D) is used in an amount of 0.1 to 20 parts by weight based on 100 parts by weight of polymer bonded to the nitroxide free radical-containing compound.

13. The method for producing a modified polymer according to claim 1, wherein the amine compound as component (E) is used in a ratio of 20 to 100 mol % relative to the organic peroxide as component (C).

14. The method for producing a modified polymer according to claim 1, wherein the amine compound as component (E) is used in a ratio of 50 to 80 mol % relative to the organic peroxide as component (C).

15. The method for producing a modified polymer according to claim 2, wherein the reaction in the presence of the amine compound as component (E) is carried out at 120 to 140° C.

16. The method for producing a modified polymer according to claim 2, wherein the reaction is carried out using a heating mixer.

* * * * *